UNITED STATES PATENT OFFICE 2,196,111

PAINT REMOVING COMPOSITION

John V. Freeman, Bellerose, N. Y.

No Drawing. Application December 23, 1937,
Serial No. 181,399

1 Claim. (Cl. 87—5)

This invention relates to paint and varnish remover compositions and more particularly to a composition which is adapted to remove the so-called "natural" paints and varnishes. "Natural" paints and varnishes are those formed with linseed oil, turpentine, gums, resins and the like naturally occurring materials as distinguished from the synthetic or unnatural materials such as cellulose lacquers and the like.

One of the objects of the present invention is to provide an improved paint and varnish remover. Another object is to provide a paint and varnish removing composition which is non-toxic, non-inflammable and non-injurious to the skin or the general health of persons utilizing the same. Still another object is to provide a remover composition that may be applied with equal facility to inclined and horizontal surfaces. Other objects and advantages will be apparent as the invention is more fully disclosed.

In accordance with these objects, I have discovered that the mixture of basic inorganic compounds comprising flue dust obtained from the operations of a ferro-manganese blast furnace, when suspended in sufficient water to form a thick paste or slurry and applied to a painted or varnished surface, has the property of disintegrating and loosening the paint or varnish on the said surface, and that after a relatively short time interval the dried paste or slurry may be washed or wiped from the surface, taking therewith the disintegrated paint or varnish leaving the surface clean and free from all traces of paint or remover compound. The thus cleaned surface after drying needs no further treatment, such as with oxalic acid for example, before the application of fresh or new paint or varnish thereto, as in the case of other paint remover compounds heretofore proposed.

The paint remover composition of the present invention is apparently non-injurious to the skin or health of persons utilizing the same. It appears to be substantially non-toxic and during the process of paint disintegration there are no fumes, noxious or toxic, evolved therefrom. It is substantially inert and non-inflammable and may be readily stored or retained any place out of the weather and out of contact with moisture with perfect safety.

The flue dust material utilized as a paint remover composition in accordance with the present invention is a finely divided impalpable powder having a greyish-white color and having a weight of nine to ten pounds per cubic foot. It is collected by electrical precipitators in the gas cleaning system leading from the ferro-manganese blast furnace. The particle size of the material is such that 80% of the material will pass through a 325 mesh sieve on water sieving.

Microscopical examination of the material discloses that it consists largely of intimately mixed aggregates which give the indication of being in part amorphous and in part crystallized. The aggregates are extremely fine grained; however, no definite compounds can be recognized in them. There is a very small amount of free silica present because the lime and manganese oxide portions exist in combination with silica as ortho-silicates. The alkalis present consist principally of potash in the form of carbonate.

The flue dust material of the present invention has the following chemical analysis:

| | Average percent | Range, percent |
|---|---|---|
| Alkalis (total) | 20.41 | 17.15 –28.21 |
| $MnO$ | 18.45 | 14.91 –21.60 |
| $SiO_2$ | 11.98 | 9.42 –17.04 |
| $Al_2O_3$ | 6.52 | 5.14 – 7.71 |
| $CaO$ | 11.50 | 9.94 –12.44 |
| $MgO$ | 2.50 | 1.73 – 3.25 |
| $FeO$ | 2.10 | 1.01 – 4.80 |
| $BaO$ | .77 | .18 – 1.51 |
| $ZnO$ | .63 | .42 – 1.10 |
| $TiO_2$ | .08 | .02 – .11 |
| $NH_3$ | .10 | .10 – .10 |
| $CO_2$ | 14.72 | 13.76 –15.68 |
| Sulphide | .73 | .13 – 1.37 |
| $SO_2$ | .75 | .20 – 1.22 |
| $SO_3$ (sol.) | 1.35 | .37 – 3.70 |
| $SO_3$ (insol.) | .40 | .09 – .79 |
| $P_2O_5$ | .31 | .31 – .31 |
| $C$ | 3.61 | .92 – 7.02 |
| $CN$ | .05 | .02 – .09 |
| $CNS$ | .28 | .23 – .33 |
| $Cl$ | 2.37 | 2.37 – 2.37 |
| $As$ | .002 | .001– .004 |
| Moisture (free) | .56 | .47 – .65 |
| | 100.172 | |

The flue dust is made up into a slurry by adding cold water, the proportion being approximately one quart of water to one pound of dust. This proportion can be varied to suit demands; that is, the consistency of the slurry can be regulated by the water addition. In the above proportion, one quart of water to one pound of dust, the slurry thus formed can be applied with an ordinary paint brush, spatula or any like tool to any painted surface and this amount of slurry will cover on the average of about 60 square feet of whatever surface it is applied to.

For all types of natural resin varnishes, the remover is allowed to remain on the treated surface from one to one and one-half hours, after which it is washed off with water, using a rag, brush or steel wool.

For all types of natural linseed oil paints, the remover is applied by the tools mentioned above, allowed to remain on treated surface for approximately 12 hours and then washed off with water, using hose if available or rag, brush or steel wool.

The cleaned surface is then well washed with clear water to remove all traces of the slurry and paint and upon drying for a sufficient length of time is ready for re-painting or re-varnishing without being further treated. The remover does not injure or discolor wood or metal surfaces and will not affect or be injurious to any subsequent coatings of paint or varnish applied to the cleaned surface.

One of the marked advantages of the paint remover composition of the present invention is that while I have indicated that one quart of water to one pound of dust should be utilized in forming the slurry, I am not limited thereby. More or less water may be used if desired, forming thereby a relatively thin or flowing slurry or a thick non-flowing slurry or mud, without loss in paint removing properties. This enables the user to apply the remover to any type or character of surface. Thus for inclined surfaces the slurry should be made relatively thick or heavy so that the same will not run off from the incline. Where the surface is cut up or provided with recesses and projections a thinner slurry adapted to be applied in the recesses or onto the projections may be made.

I do not have any explanation for the chemical action involved in the removal of paint by this flue dust material. The material is slightly alkaline but the alkali content is considerably lower than that heretofore found useful for the removal of paint and varnishes. Whether one or more of the other constituents or compounds present in the flue dust accelerate or accentuate the disintegration of the paint is unknown to me. It may be that the fineness of particle size of the inert material present in the flue dust is a factor in the activity of the same as a paint remover. Whatever the cause or reason the material when used as above indicated evidences remarkable paint removing characteristics and the thickness of the paint to be removed appears to offer little opposition to the action.

It is apparent from the above description that the present invention may be widely adapted and modified without departure from the nature and scope thereof as may be included within the following claim.

What I claim is:

A composition for removing paints and varnishes from wooden and metal surfaces, said composition consisting of flue dust and water, the water content at least being sufficient to form a relatively thick slurry of the said flue dust and the said flue dust being that which is obtained by electrical precipitation from the flue gases during the operation of a ferro-manganese blast furnace.

JOHN V. FREEMAN.